US010739736B2

(12) United States Patent
Deshpande et al.

(10) Patent No.: US 10,739,736 B2
(45) Date of Patent: Aug. 11, 2020

(54) APPARATUS AND METHOD FOR EVENT DETECTION AND DURATION DETERMINATION

(71) Applicant: General Electric Company, Schenectady, NY (US)

(72) Inventors: Rohit Deshpande, San Ramon, CA (US); Fei Huang, San Ramon, CA (US); Sivanvitha Devarakonda, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 15/876,674

(22) Filed: Jan. 22, 2018

(65) Prior Publication Data

US 2019/0018375 A1    Jan. 17, 2019

Related U.S. Application Data

(60) Provisional application No. 62/531,036, filed on Jul. 11, 2017.

(51) Int. Cl.
*G05B 19/418* (2006.01)
*G05B 13/04* (2006.01)

(52) U.S. Cl.
CPC ..... *G05B 13/048* (2013.01); *G05B 19/41845* (2013.01); *G05B 19/41855* (2013.01); *G05B 19/41885* (2013.01); *G05B 2219/31075* (2013.01); *G05B 2219/31106* (2013.01)

(58) Field of Classification Search
None
See application file for complete search history.

(56) References Cited

U.S. PATENT DOCUMENTS

| 2011/0047112 | A1* | 2/2011 | Ketabdar | G01S 5/0018 706/20 |
| 2014/0336791 | A1* | 11/2014 | Asenjo | G05B 13/026 700/44 |
| 2016/0078365 | A1* | 3/2016 | Baumard | G06F 21/552 706/12 |
| 2016/0314405 | A1* | 10/2016 | Bihannic | G06Q 10/20 |
| 2018/0139227 | A1* | 5/2018 | Martin | H04L 63/1433 |

* cited by examiner

*Primary Examiner* — Thomas C Lee
*Assistant Examiner* — Gary Collins
(74) *Attorney, Agent, or Firm* — Fitch Even Tabin & Flannery LLP

(57) ABSTRACT

An asset class type of a new asset is predicted or determined based upon an evaluation of time series data from the new asset. A predicted asset type is used to identify sensors of the new asset to use for data collection. Using the readings of selected sensors from the new asset, states of the new asset are obtained. The duration at least one of these states of the new asset is determined. This information can be subsequently used to optimize the performance of the new asset.

12 Claims, 10 Drawing Sheets

COMBINED MATRIX [495]

| | MEAN | VARIANCE | ASSET LABEL 1 | ASSET LABEL 2 | ASSET ID |
|---|---|---|---|---|---|
| T1 | 0.5 | 1.0 | CA | PA | E1 |
| T2 | 6.5 | 10.5 | PA | CA | E2 |
| T3 | 0.7 | 0.99 | CA | PA | E1 |
| T4 | 7.0 | 9.5 | PA | CA | E2 |

*FIG. 4D*

APPARATUS AND METHOD FOR EVENT DETECTION AND DURATION DETERMINATION

CROSS REFERENCE TO RELATED APPLICATION

This application claims priority to U.S. Provisional Application 62/531,036, entitled "Apparatus and Method for Event Detection and Duration Determination," filed Jul. 11, 2017, which is incorporated herein by reference in its entirety.

BACKGROUND OF THE INVENTION

Field of the Invention

The subject matter disclosed herein generally relates to the detection of events and measurement of the duration of these events that are associated with the operation of industrial machines.

Brief Description of the Related Art

Various types of industrial machines or assets are used to perform various manufacturing (or other) operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Industrial machines often operate together in plants or factories. In other examples, multiple wind turbines may be organized into wind farms, and machines may be organized as an assembly line. In yet other examples, an elevator moves people or cargo from floor-to-floor in a building. In still other examples, vehicles (e.g., cars, trucks, airplanes, or ships) are considered to be industrial machines and perform various operations.

Industrial machines typically operate according to a series of events (or operate within and transition between different states). For example, the opening and closing of automated doors (e.g., as seen in supermarkets), the asset moving in vertical or horizontal direction, or the state asset either in motion or at rest are all examples of events or states.

BRIEF DESCRIPTION OF THE INVENTION

The present invention is directed to automatically detect events and measure the duration of events for industrial assets. These approaches discover hidden system behavior without human supervision. The approaches identify the events or states of an industrial asset and the time spent in the identified events or states.

Advantageously, no human supervision or training data is required to learn or identify the system states. The approaches are applicable to many industrial domains such as aviation, transportation and emerging verticals (e.g. transportation or aviation) to mention a few examples. The approaches are noise robust, that is, not susceptible to degradation due to noise. Since the approaches are fully automated, no training or ground truth is required, which lowers the cost of the system significantly.

In many of these embodiments, multiple sensor measurements are utilized to observe and measure activity and then the detection of activity is utilized to identify whether the asset is operating or not operating. The approaches may subsequently utilize asset operational modes to discover, categorize, and model asset types as mathematical models.

The models are then used to identify the type of the asset for new assets that are coming on-line or joining existing assets (e.g., a new asset joining the fleet). Once the asset type is identified for the new asset, the asset type is used to identify relevant system characteristics (e.g., identify sensors to collect relevant data) to aid in event detection. Modeling approaches are then used to classify the operating status or states of the new asset, and to measure the time the new asset spends in any given event or state. This information can be subsequently used to optimize the performance of the new asset (e.g., re-program the asset or perform maintenance on the asset).

In others of these embodiments, an activity detection threshold in determined and used to detect whether an activity has occurred in time series data obtained from an industrial asset. Time data statistics are obtained from the time series data, and the statistics are correlated with an asset class type. A model that maps measurements or determined statistics to asset class types is created.

An asset class type of a new asset is predicted or determined based upon an evaluation of time series data from the new asset. The predicted asset type is then used to identify sensors of the new asset to use for data collection. Using the readings of selected sensors from the new asset (or statistics based upon these readings), states of the new asset are obtained. The duration of at least one of these states of the new asset is determined. This information can be subsequently used to optimize the performance of the new asset.

In others of these embodiments, a model is stored in a computing environment. The model describes and predicts behavior of a new asset or machine that is to be added to a group of currently operating assets or machines. First time series data is sensed at the new machine with a plurality of sensors.

The type of the new asset or machine is determined based at least in part upon a comparison of the model with the first time series data. Based upon the determined type, one or more of the plurality of sensors are selected to obtain additional data. The selected ones of the plurality of sensors sense second time series data from the new machine.

One or more of an event, a state, or an event duration are determined at the new machine based upon an analysis of the second time series data. An action that improves performance of the new machine is determined and is responsively based upon an evaluation of one or more of the determined event, state, or event duration.

In aspects, the model is built previous to sensing the first time series data, the model being built based upon detected patterns in sensed third time series data. In other aspects, determining an event utilizes a sliding time window that is applied to the first time series data. In still other aspects, the action is a maintenance action. In other examples, the action is the creation of an electrical control signal, and the electrical signal is transmitted to the new machine to control an aspect of the operation of the new machine.

In examples, the one or more sensors are configured to sense speed, chemical composition of emissions, altitude, or gas pressure. In other examples, a Hidden Markov Model (HMM) is used to filter the events based upon knowledge of a domain in which the new machine is operating.

In others of these embodiments, a system includes a network, a currently operating machine that is coupled to the network, and a new machine that is to be added with the currently operating machine. The new machine has a plurality of sensors that sense first time series data at the new machine. The computing environment is configured to store a model that describes and predicts behavior of the new machine.

A control circuit is coupled to the network and is configured to determine a type of the new machine based at least in part upon a comparison of the model with the first time series data. The control circuit is further configured to, based upon the determined type, select one or more of the plurality of sensors to obtain additional data. The selected ones of the plurality of sensors sense second time series data from the new machine. The control circuit is further configured to determine one or more of an event, a state, or an event duration at the new machine based upon an analysis of the second time series data, and to responsively determine an action that improves performance of the new machine based upon an evaluation of one or more of the determined event, state, or event duration.

BRIEF DESCRIPTION OF THE DRAWINGS

For a more complete understanding of the disclosure, reference should be made to the following detailed description and accompanying drawings wherein:

FIG. 4D is a block diagram of data utilized in the flowcharts of FIGS. 4B and 4C according to various embodiments of the present invention;

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, events (or states) occurring at industrial machines are determined, and the duration of these events (or states) is determined. Advantageously, no human supervision or training data is required to learn or identify the states of the machine, or the duration of these states.

Figure 1:
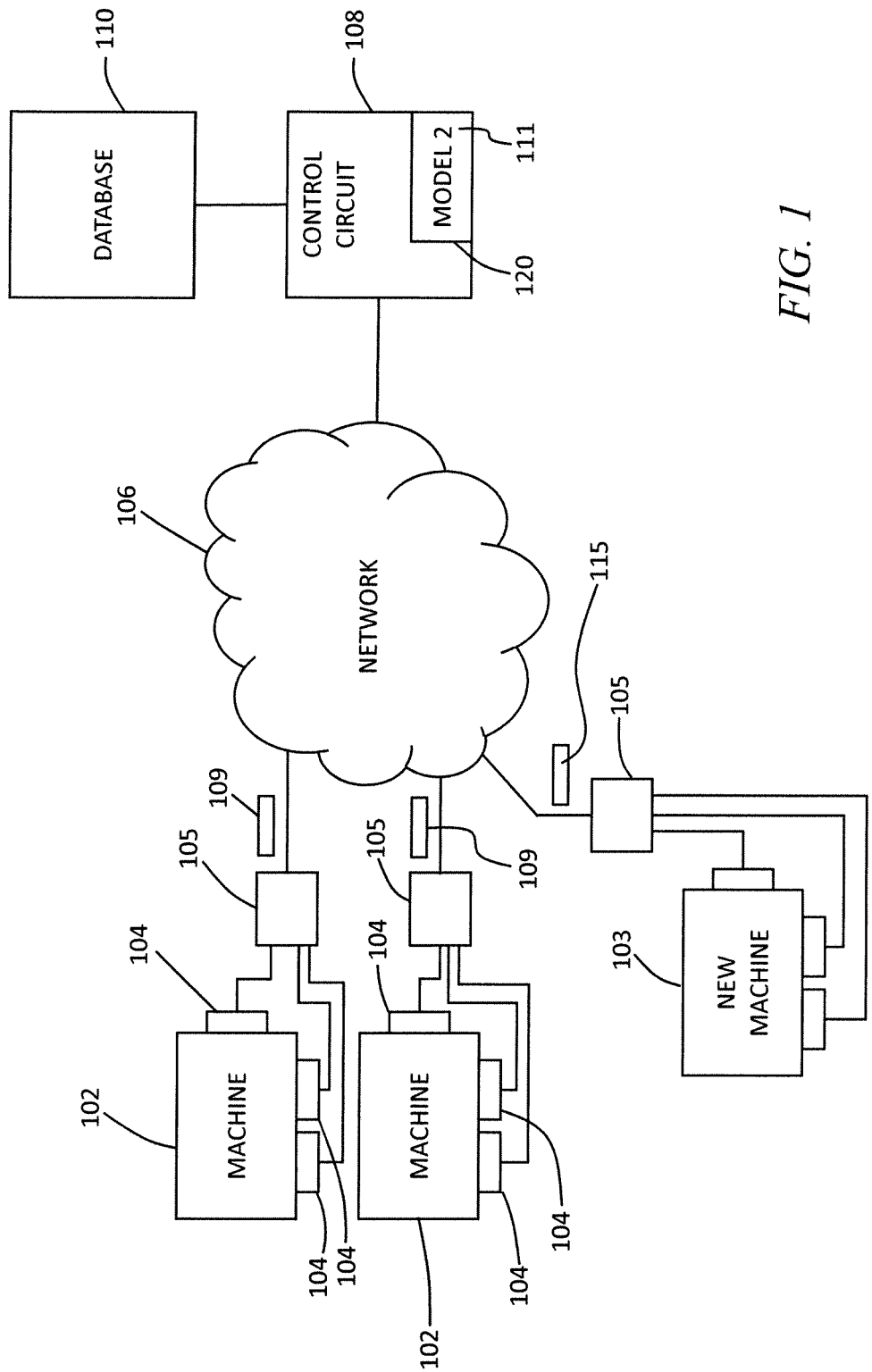
FIG. 1 comprises a block diagram of a system for determining activity and determining the duration of activity according to various embodiments of the present invention.

Referring now to FIG. 1, a system 100 for event detection and duration determination includes industrial machines 102, sensors 104, a network 106, a control circuit 108, and a database 110.

The industrial machines (or assets) 102 may be any type of machine such as windmills, boilers, reactors, elevators, computers, or vehicles to mention a few examples. Although the machines described herein are referred to as industrial machines, it will be understood that the machines can be any type of device or asset whether operating in a factory environment, an industrial environment, a transportation environment, an office environment, or any other type of environment.

The sensors 104 are any type of apparatus that obtains or measures any type of characteristic. For example, the sensors 104 may measure humidity, temperature, speed, position, altitude, movement (e.g., up or down, right or left) to mention a few examples.

The network 106 is any type of communication network or combination of networks. For example, the network 106 may be disposed at the cloud. In other examples, the network may include the internet. Other examples of networks and combinations of networks are possible.

Transceivers or edge devices 105 allow the sensors 104 to communicate with the network. In one example, the transceivers receive sensed or measured time series data 109 from the sensors 104, convert the data into a form appropriate for network transmission, and then transmit the time series data over the network 106. The data may be organized as data matrices before the data is sent (with sensors being columns in the matrix, and rows representing different times, e.g., the first row being time t1, the second row being time t2, and so forth).

The control circuit 108 receives time series data from the sensors 106 and performs various operations on this data. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

The database 110 is any type of data storage device. The database 110 and the control circuit 108 are shown in FIG. 1 as being located at the cloud. However, it will be appreciated that the control circuit 108 and the database 110 may also be located remotely at the machines 102.

In one example of the operation of the system of FIG. 1, an activity detection threshold is determined and used to determine whether an activity has occurred in sensed or time series data 109 obtained from the industrial machines 102. Time data statistics are obtained from the data 109, and the statistics are correlated with an asset class type (e.g., elevator, elevator door, or motor type) by the control circuit 108. A model 111 that maps determined statistics to asset class types is created and, in some examples, is stored in a memory 120 in the control circuit 108. The memory may be a random access memory (RAM) in one example. In other examples, the model 111 is stored in a memory (e.g., a RAM) at one of the transceivers or edge devices 105.

A new machine 103 is to be added to the machines 102. An asset class type of the new machine 103 is determined or predicted based upon an evaluation of time series data 115 from the new machine 103. The predicted model type is used by the control circuit 108 to identify which of the sensors 113 of the new machine 103 to use for data analysis. Using the readings of selected sensors from the new machine 103 (or statistics, e.g., mean values, associated with this data), states of the new machine 103 are obtained or determined by the control circuit 108. The duration at least one of these states of the new machine 103 is determined by the control circuit 108. This information can be subsequently used to optimize the performance of the new machine 103. For example, the control circuit 108 may generate electronic signals sending messages to users. Electronic signals may be sent to the machine 103 that may re-configure or re-program aspects of the machine 103.

In yet another example, the transceiver 105 is an edge device and the network 106 is the cloud. As shown, the sensors 104 are connected to industrial machines 102. The sensors 104 gather data on these machines such as humidity, temperature, speed position to name a few examples. The data collected by the sensors 104 are then sent to the edge device 105. In aspects, the edge device 105 is an electronic computing device that is equipped with a processor and memory. The edge device 105 is often connected to the cloud 106 via another network (i.e. an ethernet, Wi-Fi, or cellular network).

In other aspects, the models 111 (e.g., machine learning models) are hosted by the edge devices 105, and the models 111 reside in the memory of the edge devices 105. The data 109 collected from the sensors 104 is then processed by the model 111 and sent to the cloud 106. The data 109 can either reside for a certain time at an edge device 105 until it is sent to cloud 106 or off-loaded at a certain time. For example, sensors 104 that are connected to turbines may report an increase in the temperature. When the temperature reaches a certain threshold as determined by the model 111, an alert is sent to the cloud 106 to take immediate action. In another example, the take-off and landing information along with the altitude change of an aircraft are recorded by the sensors 104 and processed by the model 111 on the aircraft. The analysis done by the model 111 is saved in memory during the flight and off-loaded when the aircraft lands and reaches a terminal.

In still another example, the sensors 104 are connected to the machine 102 and send data 109 to the cloud 106 over another network (i.e. ethernet, Wi-Fi, or cellular network). The sensor data 109 is then stored in a database 110. The machine learning models 111 created for a certain task, reside in the memory 120 of the control circuit 108. In aspects, the control circuit 108 (or cloud computing approaches) is composed of multi-processors and larger memory than the edge device 105. The machine learning models 111 access the sensor data 109 from the database 110 and output results.

In yet another example, the sensors 104 are connected to the machine 102 and send data to the cloud 106. The data is then stored in the database 110. The models 111 in the control circuit 108 access the sensor data 109 from the database 110. A model created for a certain task, trains itself on this data. Once, the model is sufficiently robust for a certain task, the model is sent to the edge device 105 via the network 106 where it processes incoming data from the sensors 104.

It will be appreciated that the output of the models 111, which are actionable insights, can be sent to dashboards where the data is displayed for technicians. The dashboards help the technicians to take actions on what they see. It can also be seen that certain models work in-situ (i.e., on the edge device 105) while others work remotely (i.e. in the cloud 106).

Figure 2:
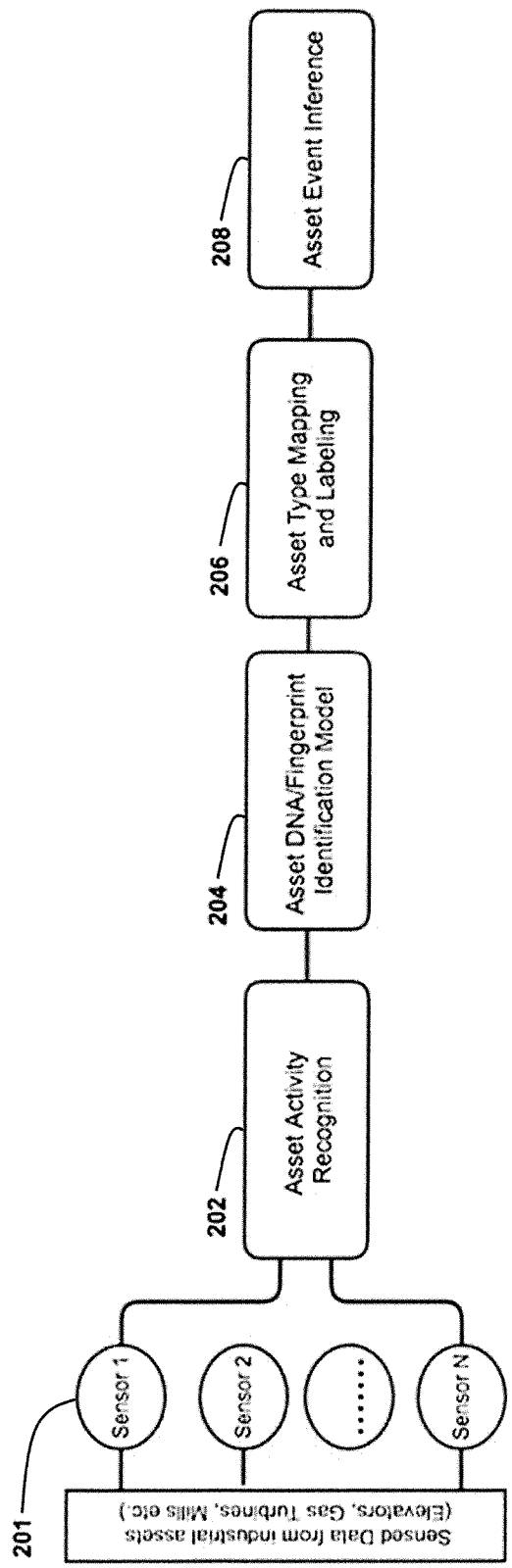
FIG. 2 comprises a flow chart of an approach determining an event type and determining the duration of activity according to various embodiments of the present invention.

Referring now to FIG. 2, one example of an approach for event detection and duration determination is described. Sensors 201 obtain time series data from industrial machines or assets. At step 202, data from sensors 201 is obtained, an activity threshold is determined from the time series data, and a determination is made as to whether activity is detected in the time series data obtained from the sensors 201.

At step 204, asset type identification occurs. In this step, a determination is made as to the asset type(s) in the time series data. At step 206, a model is created. In aspects, the model maps asset types to data patterns (or statistics) from particular assets. Once a model is determined, data from new assets can be compared to the model and a determination of the asset type of the new asset can be made.

At step 208, asset event inference occurs. In this step, a new asset is added to the group of existing assets, the model is used to determine an asset type, and then time series data from the new model is evaluated to determine an event or states of the new asset. A determination as to the number of events and states over time can be made. The duration of these events and states may also be determined. This information can be subsequently used to optimize the performance of the new asset. For example, messages may be sent to users to perform maintenance on the machine. Electronic signals may be sent to the machine that may automatically re-configure or re-program aspects of the machine. Other examples are possible.

Figure 3:
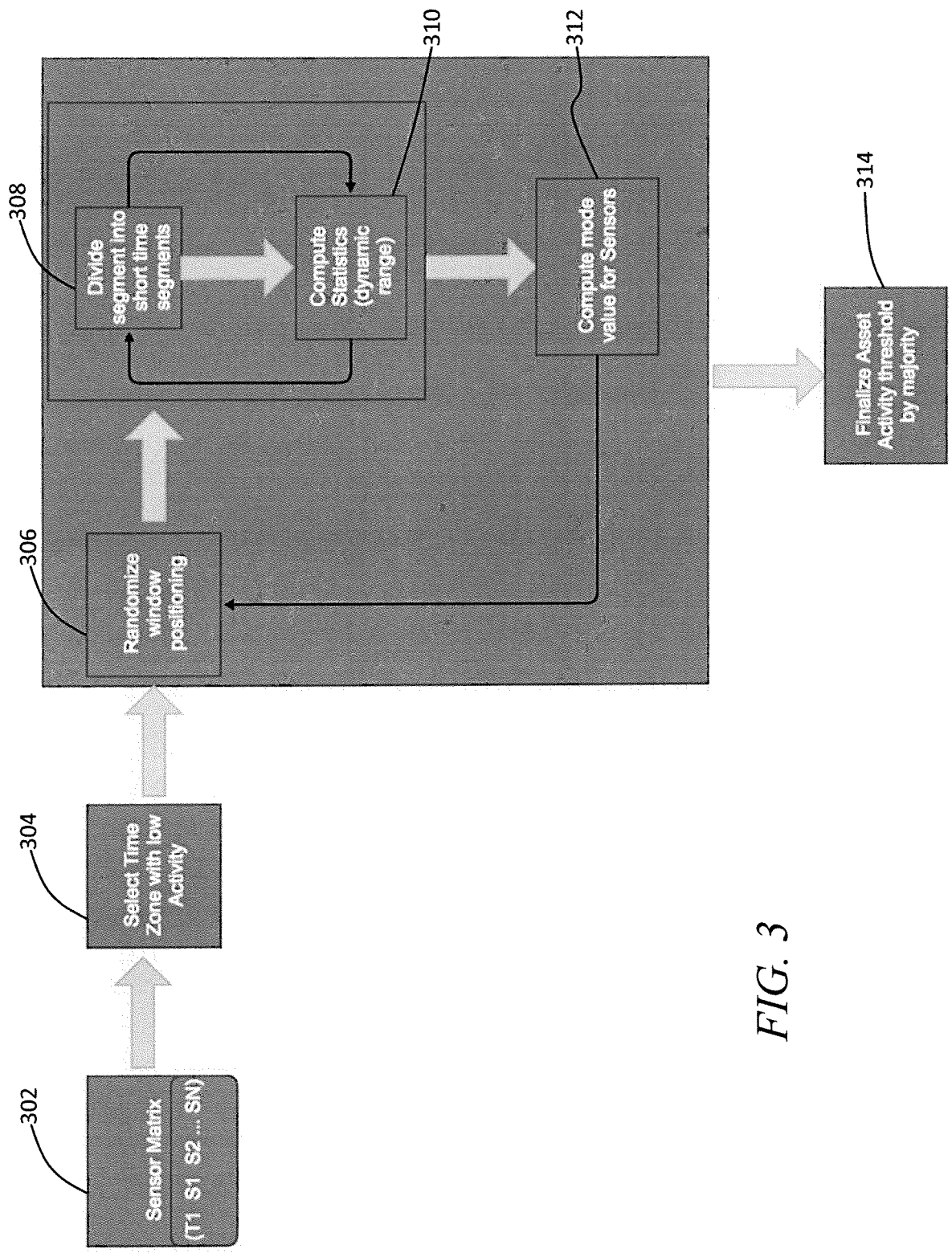
FIG. 3 comprises a flowchart that describes an approach for determining an activity threshold according to various embodiments of the present invention.
Figure 4A:
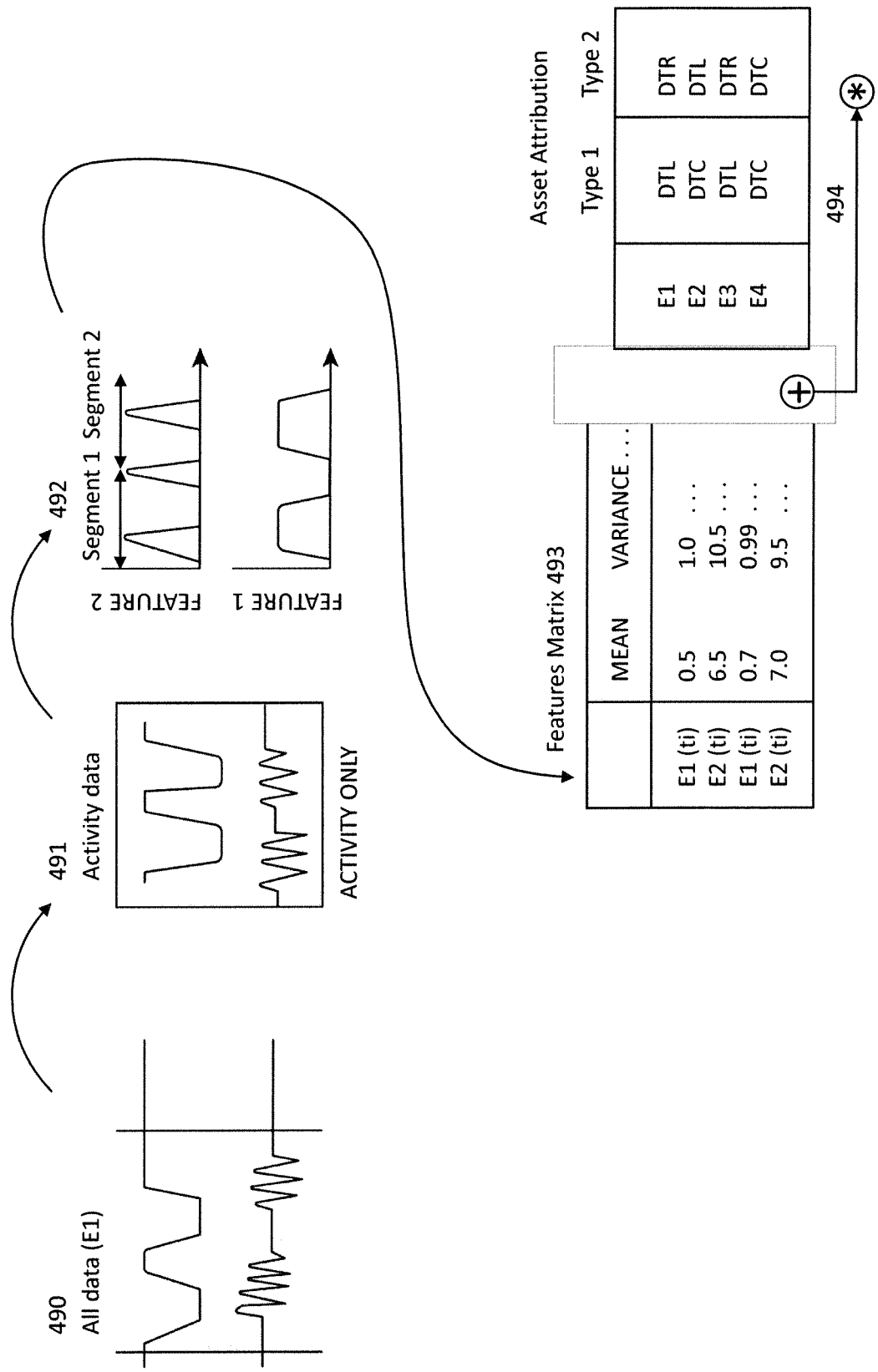
FIG. 4A comprises a block diagram of data utilized in the flowcharts of FIGS. 4B and 4C according to various embodiments of the present invention.
Figure 4B:
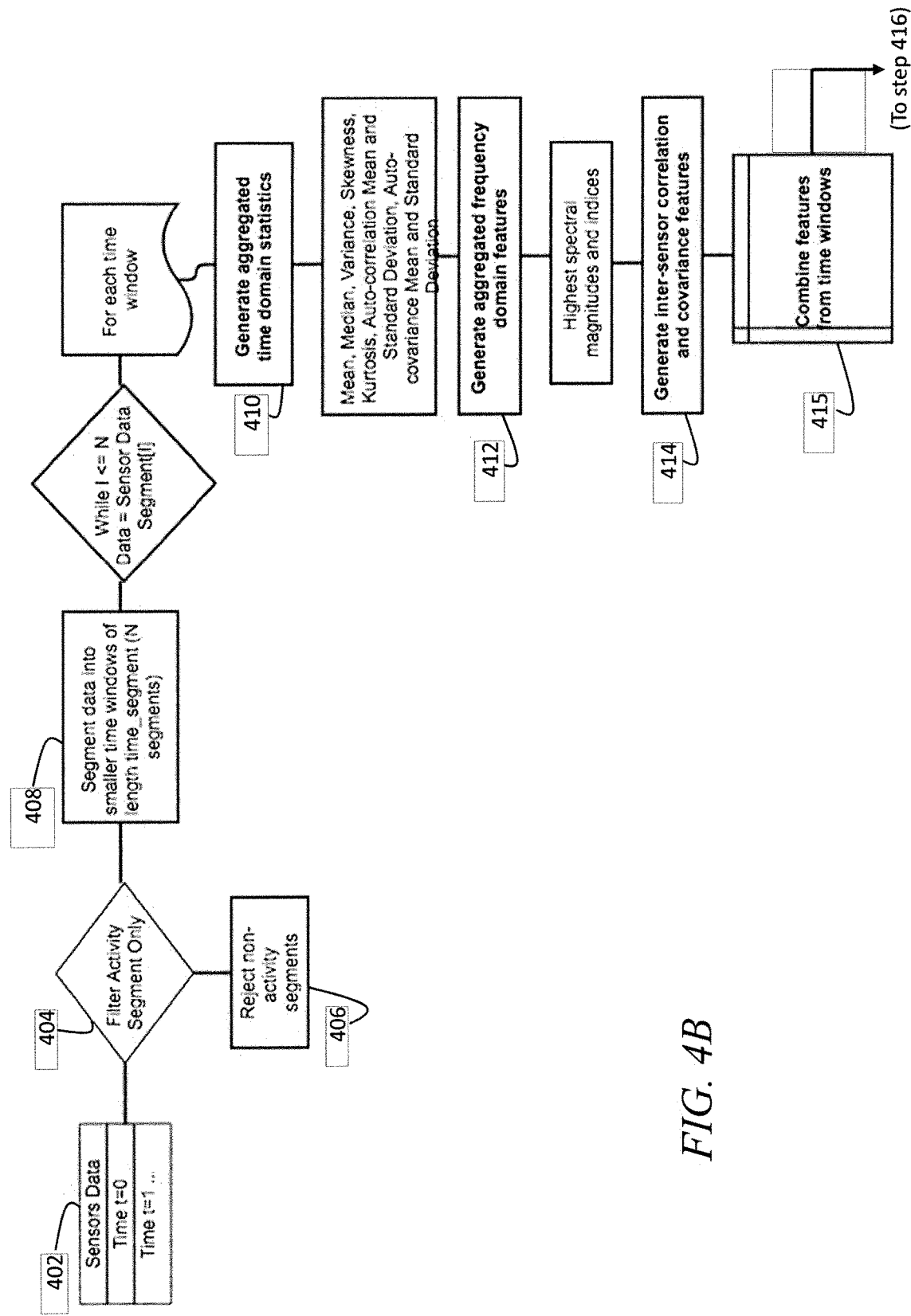
FIGS. 4B and 4C comprise flowcharts of an approach of determining a model, and then using the model to determine an asset type according to various embodiments of the present invention.
Figure 4C:
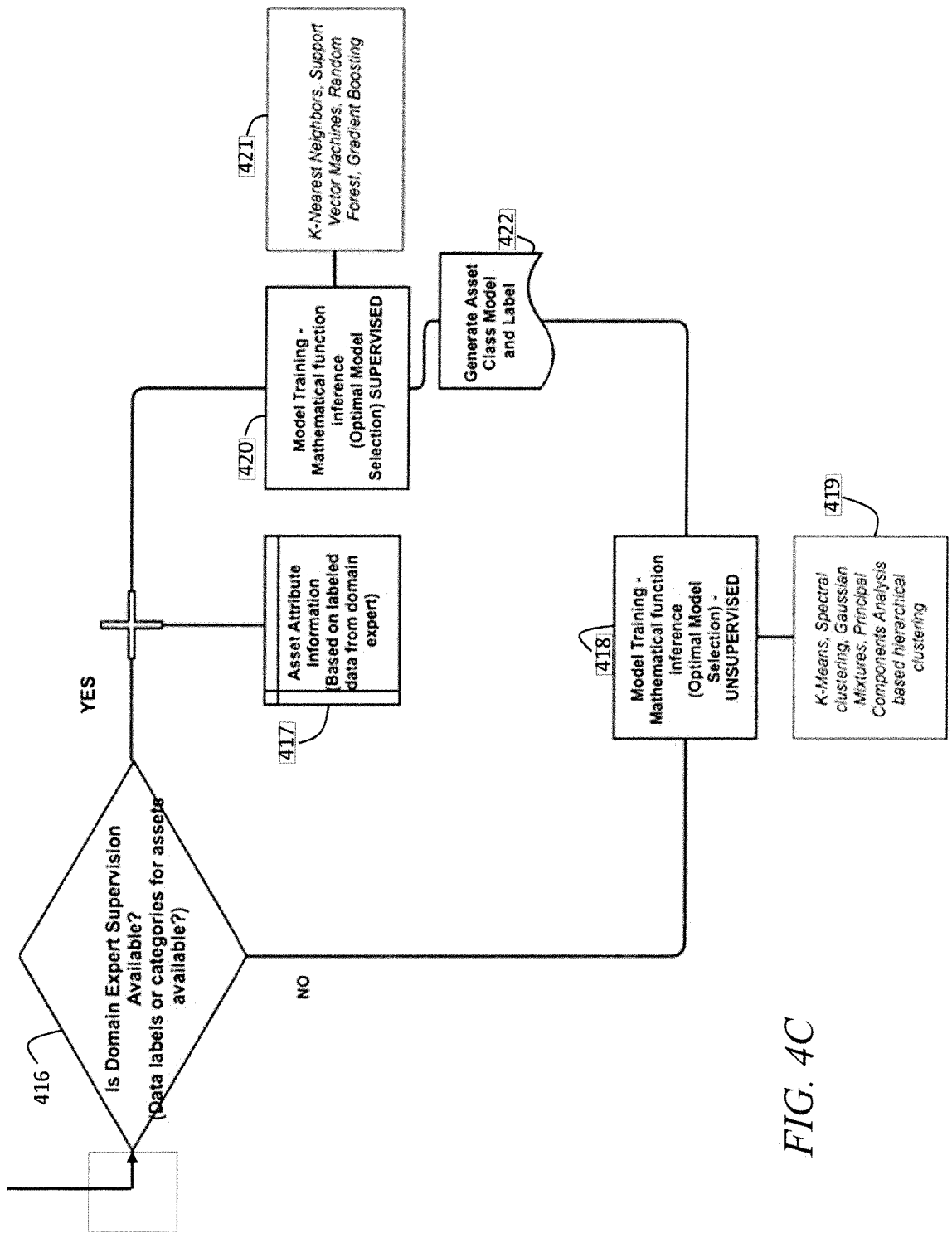

FIG. 3 is an example of an approach for determining an activity threshold. At step 302, sensor data is received from a machine in the form of a matrix. The matrix may include columns and rows. The rows may represent different times, and the columns are different sensors, with data from a sensor at a particular time located at each matrix location.

At step 304 a time zone (range of times) with perceived or known low activity is selected. By "low activity," it is meant a usage parameter (e.g., how many times the asset is used) falls below or is expected to fall below a threshold value. In examples, a time when there is little human activity (so that there is no activity with the asset) is selected. The low activity time may be different for different types of assets. The time zone may be 2:00-5:00 am in one example.

At step 306, a random window position (e.g., 2:00-2:30 am) is made within the overall time window. At step 308, this window position is divided into still smaller segments (e.g., five minute segments, e.g., 2:00-2:05 am). At step 310, statistics are computed for a five-minute segment. Descriptive statistics such as standard deviation, mean, or dynamic range are computed for the five-minute segment. Then, this process is repeated until statistics for all five-minute segments within the 2:00-2:30 am window are computed.

At step 312, the median value in the time window (e.g., 2:00-2:30 am) is determined. The median value is selected as it is robust so as not to be affected by any outliers that may exist. Then, the process returns to step 306, to analyze the next window (e.g., 2:30-3:00 am).

When all windows within the 2:00-5:00 am time period are processed, the mode within all the windows, as a majority rule, is determined (i.e., a value that is most common) at step 314. This value becomes the initial activity threshold for the given sensor and is stored in the configuration file on the system. That is, when a value of new data is at or above the activity threshold, then activity exists. When the value of new data is below this value, no activity exists. The configuration file is then used to store and update the activity threshold value on a regular basis such that the whole process is made dynamic. Any updating procedure can be used to orchestrate this process. This decision is left to the user.

Referring now to FIGS. 4A, 4B, 4C, and 4D (collectively referred to herein as "FIG. 4,") an approach for asset identification and mapping (creation of a mathematical model representation of asset characteristics) is described. The approach described in FIG. 4 results in the creation of a model at step 422.

One purpose of the approach of FIG. 4 is to identify patterns and classes that define attributes of a given asset where system characteristics are available via domain experts and capture that information into a mathematical model representation. The model is then used to infer characteristic attributes/classes of new assets where such system information is unavailable (e.g. third party or legacy systems). The approach of FIG. 4 then uses the asset class type to select the appropriate inputs and set model parameters in order to detect asset events and provide high accuracy for event inference.

At step 402, a sensor data matrix is received. At step 404, it is determined whether activity exists in the received data. This is based on the premise that asset signatures are distinguishable only when there is activity occurring and is implemented to provide higher accuracy. An approach may be utilized to determine whether activity exists. If no activity is recognized in the received data, the data segment being analyzed is discarded at step 406.

On the other hand, if activity is recognized, then step 408 is executed. At step 408, the sensor data matrix is split into smaller time windows. The size of these window may be determined by a user or supervisor.

At step 410, for each time window, sensor(s) time domain statistics are determined from the sensor data matrix, and a statistics matrix 493 is created. In examples, the statistics in the matrix may include the mean, the median, or data skewness. Other examples are possible. The statistics matrix 493 is produced to include this determined information. The rows of the statistics matrix represent a time and a machine (e.g., machines E1 or E2). The columns in this matrix are particular statistics present for a sensor at a time.

At step 412, a Fast Fourier Transform (FFT) is applied to the data to transform the data from the time to frequency domain. The purpose of this step is to add system characteristics that are present in the frequency domain. Asset classes can be separated based upon frequency characteristics.

At step 414, for each time window, inter sensor covariance is generated. In this step, inter sensor time domain and energy features are calculated in order to infer time and state-based interactions within the system. For example, a time series of correlation coefficients may be generated for all possible sensor combinations available to the designer. In one specific example, correlation coefficients between humidity and gas pressure may be calculated.

If domain specific information is available and data can be categorized, a pre-programmed reference matrix 494 is created, for example, by a system supervisor. In aspects, the matrix 494 has rows representing a machine that is mapped to an asset type (e.g., E1 is a machine that is mapped cargo airplane, E2 is a machine that is mapped to passenger airplane), and columns that are statistics. The matrix 494 may be pre-programmed into the system, for example, by a supervisor.

Prior to step 420, the pre-programmed reference matrix 494 and the statistics matrix 493 produced at step 415 are merged together as inputs (495) to the supervised modeling step 420 (represented by an equation: $(y=Fn(x1, x2, \ldots Xn))$) where y is the asset type, x1 is a first statistic, x2 is a second statistic, and xn is an nth statistic). The model here is a mathematical transformation that provides a mapping from the domain of the asset sensor data to an asset class type based on supervision.

If domain expert supervision or labeled categories of the asset or its elements are unavailable, the sensor feature data produced from step 415 advances to step 418.

At step 422, a model is selected to detect the type of asset and the asset's signals using one of the following approaches: a) a supervised learning based asset class identification approach, when information from domain or expert is available, at steps 420, 421, orb) an unsupervised learning based asset class identification approach, when domain specific details are unavailable or data is anonymous or unlabeled, at steps 418, 419.

The supervised learning based asset class identification approach (steps 420, 421) is now described. Data that has been identified as belonging to a group based on a domain expert is referred to as training data (e.g. matrix 442). The training data consists of a set of training examples (e.g. a domain expert may inform some types may contain high forces at specified frequencies). The combination of the engine type with the force magnitudes at various spectra becomes a training sample for that engine type). In supervised learning, each example is a pair consisting of an input object (typically a vector or matrix of sensor features) and a desired output value (also called the supervisory signal). In this case, it would be the asset class or attribute. A supervised learning algorithm analyzes the training data and produces an inferred function, which can be used for mapping new examples. In this instance, the supervised algorithm is selected so as to provide the best cross-validation metrics. Some of the candidate algorithms include K-nearest neighbor approaches, Random Forest approaches, and support-vector machines (SVM) approaches. These can be used with the training data to identify the approach that provides the best mapping to the asset class based on optimizing the cross-validation metrics.

Additional supervised training methods may be considered by a user based on the characteristics of the data. For instance, cross-validation that involves partitioning data into subsets, performing the analysis on one subset (called the training set), and validating the analysis on the other subset (called the validation set or testing set) can be utilized.

The method that best determines the class types across all the subsets is considered to optimize the cross-validation score. This step is required as the input data dictates the model that best fits the class types within the data. For instance, an SVM may best explain the data classes based on CT images, whereas the K-Nearest Neighbors may best explain an engine propulsion mode.

The un-supervised learning based asset class identification approach (steps 418, 419) is now described. When domain expert supervision is unavailable and the relationship between the underlying categories of assets to the data are unknown, i.e. the examples provided to the learner are unlabeled, these approaches may be used.

Several approaches exist for selecting a mathematical model that best represents the hidden asset classes in the data using unsupervised learning methods. Such approaches include but are not limited to K-Means, Spectral clustering, Gaussian Mixtures, and Principal Components Analysis based hierarchical clustering. There may be other methods that a user skilled in the art could apply based on the data characteristics.

Once the various approaches are applied, the approach that results in the highest intra-asset class similarity and lowest inter-asset class similarity is then chosen as the candidate unsupervised model for the given application. It will be appreciated that other metrics may also be used by a user skilled in the art and may include normalized mutual information and purity, Bayesian or Aikake information criteria.

The model is a transform that maps statistics to an asset type developed using the approaches identified in FIG. 4. In the present example, statistics of 1 and 2 map to the type cargo airplane (CA). Statistics of 3 and 4 map to the type cargo airplane Statistics of 10 and 15 map to the type passenger airplane (PA). Thus, and in this example, y (the type) is defined by sensor readings (x1, x2).

Figure 5:
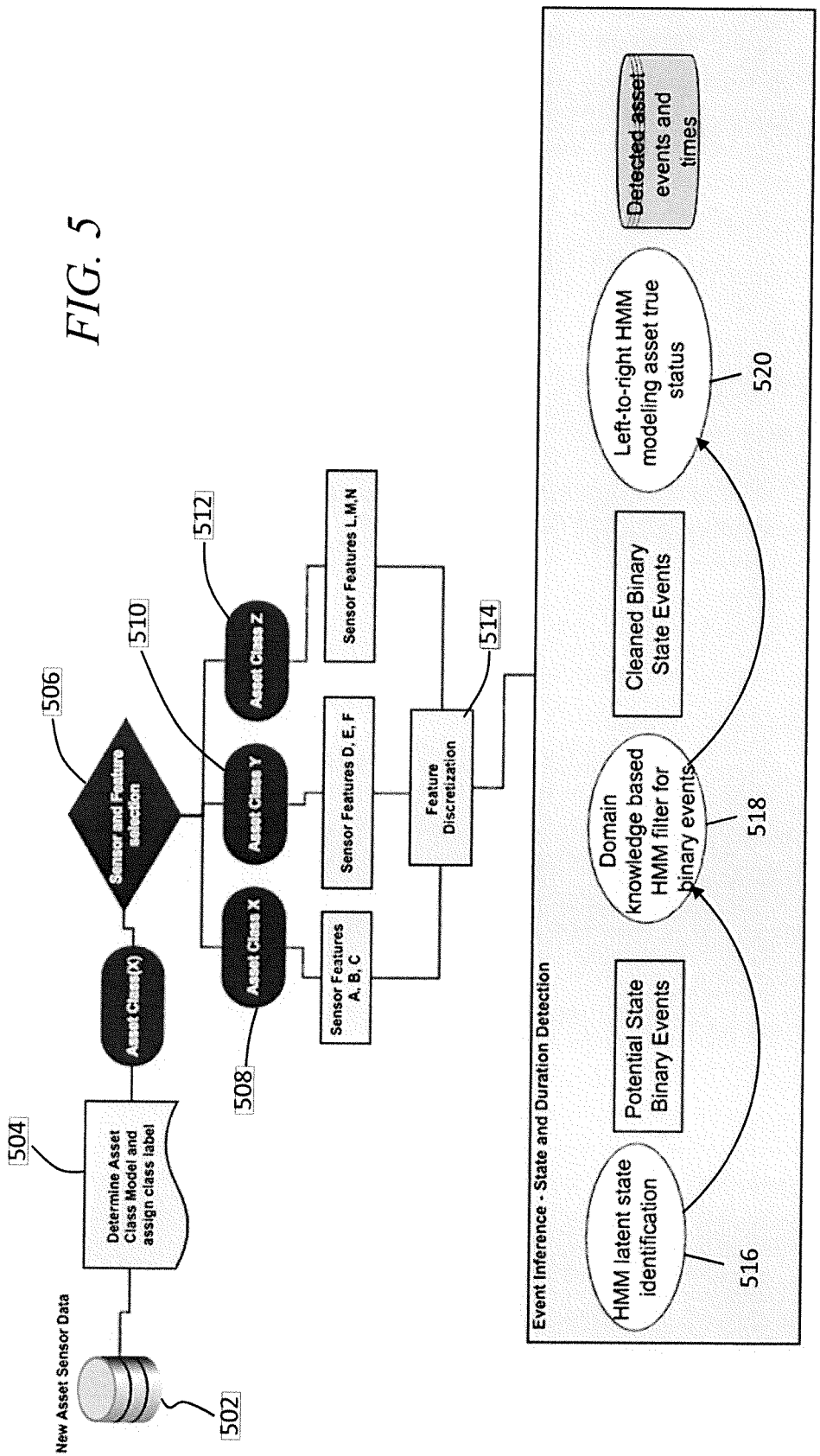
FIG. 5 comprises a flowchart showing an approach for the determination of events or states of the asset or the new asset according to various embodiments of the present invention.

Referring now to FIG. 5, and now having a label for an asset (e.g., produced by the algorithm of FIG. 4) and new or additional data from the asset (or a new asset), a determination is made as to events or states of the asset or new asset. At step 502, the new or additional data in the form of a data matrix is received. At step 504, the asset type label (e.g., determined by the approach described in FIG. 4) is obtained. For example, the asset type CA is obtained.

At step 506, the sensors that are to be used for the asset type are determined. For example, asset type CA may have a predetermined list of sensors associated with this type. A look-up table may be used to represent this mapping.

At step 508, based on the asset classes identified and down-selection of sensors used for instance for asset class X (e.g., time domain) sensor features are obtained. At step 510, for an asset of class Y (e.g., energy sensor) features are obtained. At step 512, if the asset class is Z (e.g., frequency domain) sensor features are obtained. By "features," it is meant physical measures of an asset (or element of the asset) event, performance, operation, movement, or state. For example, if the asset is an elevator, the feature may be a current value or a force value. It will be appreciated that these types of values or parameters are examples only, and that other examples are possible.

At step 514, continuous sensor feature values are converted to discretized sequences. K-means clustering as known to those skilled in the art may be used to obtain these flags. For a "door opening" event, a 0 may be chosen. For a "door closing" event, a 1 may be assigned. The data obtained is then mapped according to these event flags as described below.

Figure 7:
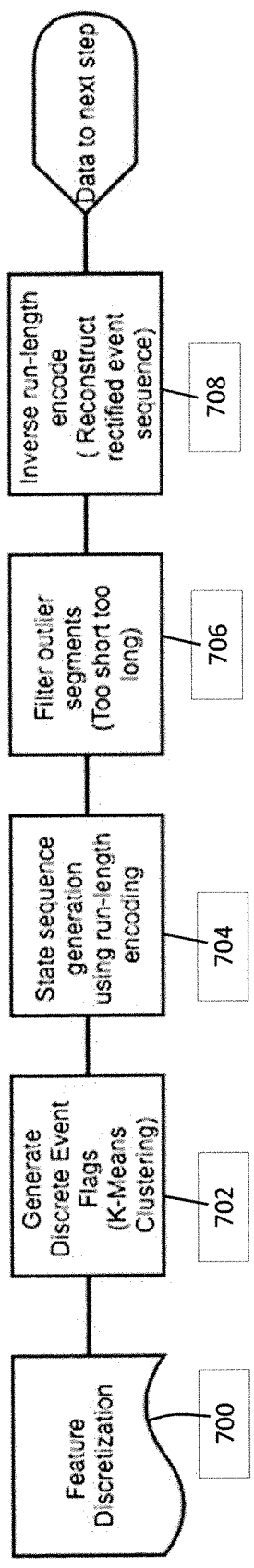
FIG. 7 comprises a flowchart showing an approach for performing a discretization step according to various embodiments of the present invention.
Figure 7:
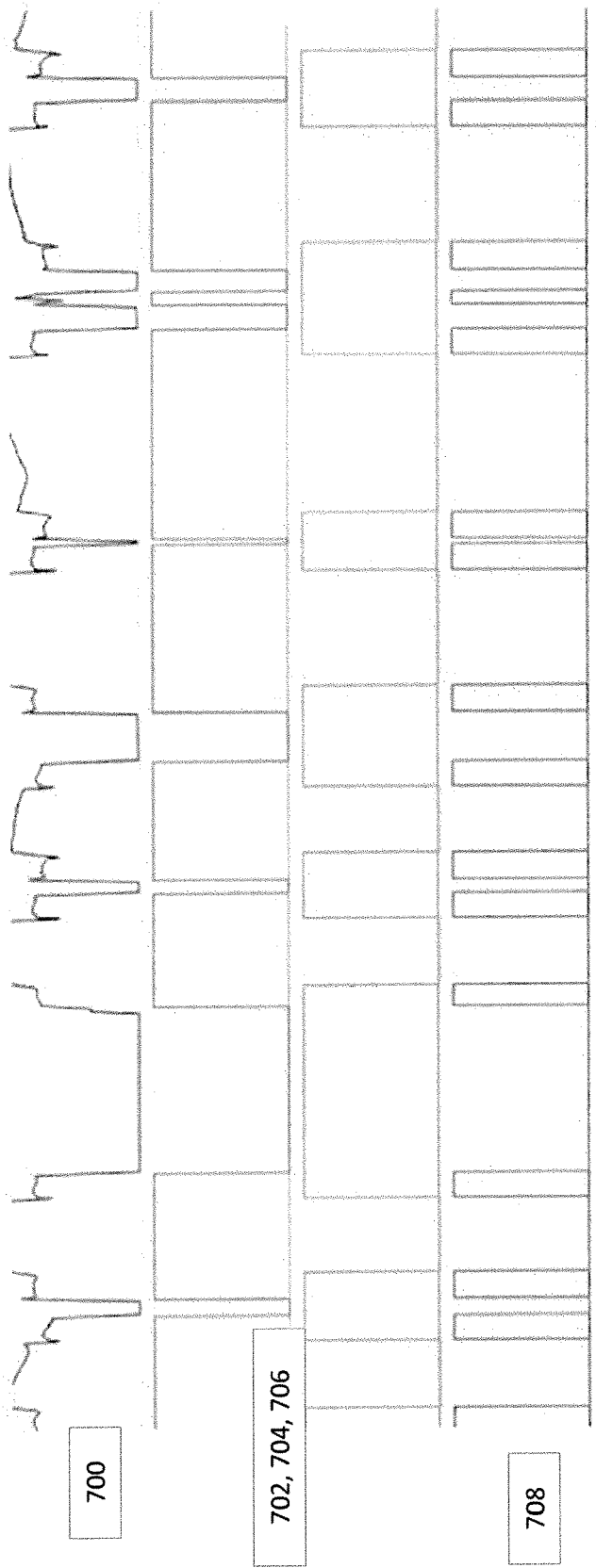

One example of an implementation of step 514 is described with respect to FIG. 7 elsewhere herein. The sensor feature values are inputs to the K-Means clustering algorithm, that discretizes the data to a pre-determined set of bins. Sequence counting is then performed to get run lengths of each sequence. For instance, the sequence (000000001111111111) may yield the following sequence value=0, sequence length=8, followed by sequence value=1, sequence length=10. Filtering is performed to correct or remove run lengths that are anomalous too small or too long based on domain expertise. For example, in the above example, if there was an error (0000000001111001111), where (00) are inserted due to an error, they would be rectified by the filtering algorithm. The original correct sequence is reconstructed to (000000001111111111) and passed on to the next step which is the event inference using hidden Markov modeling approaches as known to those skilled in the art.

At step 516, HMM latent state detection is performed. With this step, a multi-latent states Hidden Markov Model (HMM) is applied on the normalized window signal input. This HMM tries to classify the data into event signals, non-event signals, and noise while taking the time dependency of data points into account. The identified noise is then discarded and events/non-events are flagged.

At step 518, domain knowledge based HMM filter for binary events is performed. With this step, another HMM filter is applied. One purpose of this filter is to use domain knowledge to filter out events that are unlikely to happen, such as an airplane takeoff is unlikely take more than some amount of time. Such domain knowledge can be coded into the transition matrix and emission matrix parameters of HMM. This step generates a binary flagged signal indicating an event (e.g., an airplane taking-off/landing) and a non-event (e.g., airplane cruising, or idle). In this example, it is assumed that airplane cruising and idle have similar patterns because the airplane is not performing drastic actions in either situation.

At step 520, left-to-right HMM modeling asset true status is performed. With this step, a left-to-right HMM is applied to detect the actual states of the asset. This HMM is parameterized to reflect the asset actual behavior, such as an airplane going from idle to takeoff, to cruise, to landing, and repeating the process. This MINI will label the signal based on this logic, and the output of this model is recorded as the final outputs of detected actual events.

Figure 6:
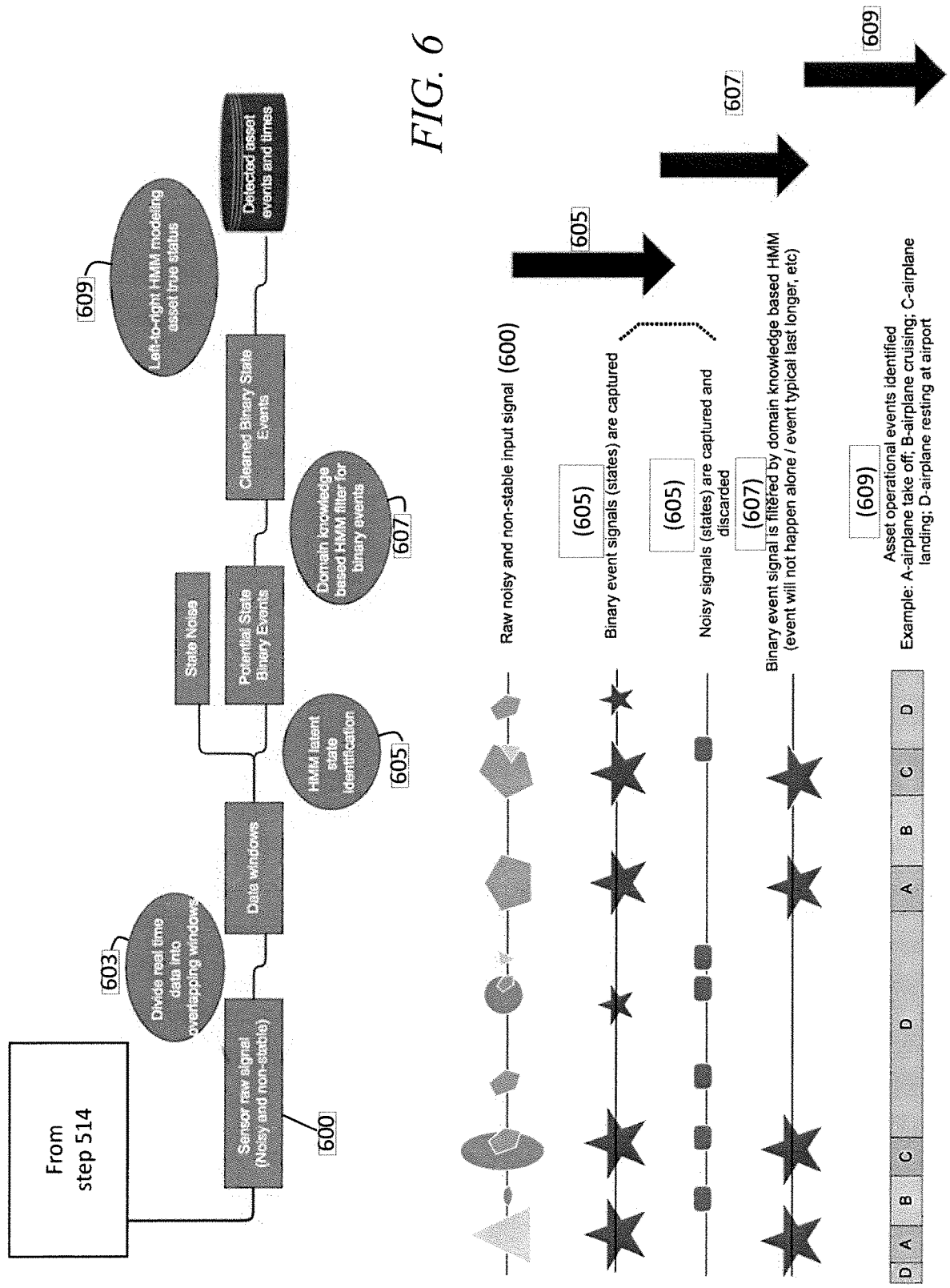
FIG. 6 comprises a flowchart showing an approach for determining an event type and duration according to various embodiments of the present invention.

In this example (and as shown in FIG. 6), the events are generated along an x-axis. The x-axis is a time axis with arbitrary time units. Consequently, and examination of the time axis with respect to an event type yields the time duration of that event. After the completion of step 520, the type and duration of the event has been determined.

FIG. 6 is an approach for determining asset events and durations. This approach can be widely applied to different assets (e.g., an airplane) that are monitored by sensors with time series monitoring data. This approach will be able to robustly detect events (e.g., airplane takeoff, cruising, landing, and idle to mention a few examples) of this asset. In general, as shown, noisy and non-stable input signals 600 are generated by the asset as the input to the approach of FIG. 6. Step 605 applies a model to detect the events (e.g., asset drastic actions, such as airplane takeoff and landing) and noise. Step 607 then filters through the events by a domain knowledge based Hidden Markov Model (HMM) (e.g., landing has to happen after airplane takeoff, landing has to be at least 10 minutes) to further clean up the events. Step 609 uses an event order based HMM to detect the actual asset states (e.g., airplane takeoff, cruise, or landing, idle).

At step 603, overlapping windows are implemented. Streaming data are broken into a series of overlapped windows. This windowing method allow model to be applied constantly on the streaming data to generate live event detection results, and the overlapping confirms that events occurs at the boundaries of a window is still fully captured. More specifically, the event could be on the boundaries of both event. Breaking a short-lived event may lead to errors in identification because their durations are further shortened. The overlapped window ensures that the full event is captured in at least 1 of the windows. A Z-score normalization is applied afterwards.

At step 605, a multi-latent states Hidden Markov Model (HMM) is applied on the normalized window signal input. This HMM tries to classify the data into event signals, non-event signals, and noise while taking the time dependency of data points into account. The identified noise is then discarded and events/non-events are flagged.

At step 607, another HMM filter is applied. The main purpose of this filter is to use domain knowledge to filter out events that are unlikely to happen, such as that an airplane takeoff is unlikely to take above a predetermined amount of time. Such domain knowledge can be coded into the transition matrix and emission matrix parameters of HMM. After step 607 has executed, a binary flagged signal indicating an event (e.g., airplane taking-off/landing) and non-event (e.g., airplane cruising, idle) is generated. In this example, it is assumed that airplane cruising and idle has similar patterns in this specific example because airplane is not performing drastic actions in either situation.

At step 609, a left-to-right HMM is applied to detect the actual states of the asset. This HMM is parameterized to reflect the asset actual behavior, such as an airplane will go from idle to takeoff, to cruise, to landing, and the process is repeated. This HMM will label the signal based on this logic, and the output of this model is recorded as the final outputs of detected actual events.

In this example, the events are generated along an x-axis. The x-axis is a time axis with arbitrary time units. Consequently, and examination of the time axis with respect to an event type yields the time duration of that event. At the conclusion of step 609, the type and duration of the event has been determined.

Referring now to FIG. 7, one example of the implementation of feature discretization (step 514 of FIG. 5) is described. At step 702, discrete event flags are generated, for example using K-means clustering. More specifically, a K-Means clustering algorithm discretizes the data to a pre-determined set of bins (e.g., memory locations).

At step 704, state sequence generation using run length encoding is performed. More specifically, sequence counting is performed to get run lengths of each sequence. For instance (0000000001111111111) may yield the following sequence value=0, sequence length=8, followed by sequence value=1, sequence length=10.

At step 706, outlier segments are filtered. Filtering is performed to correct or remove run lengths that are anomalous too small or too long based on domain expertise. For example, if there was an error (0000000001111001111), where (00) was inserted due to an error, this error would be rectified by the filtering algorithm.

At step 708, inverse run length encoding is performed. In this step, the original correct sequence (000000001111111111) is reconstructed and passed on to the next step which is the event inference using hidden Markov modeling.

In other aspects, a neural network with multiple data steams (some with data indicating physical movement of an elevator, some not indicting physical movement of an elevator) is trained. When the trained neural network obtains another data stream, it is able to determine if the data stream contains data indicating physical movement. The data may be obtained from sensors such as accelerometers.

More specifically, a feedforward neural network maps an input feature vector x, which contains accelerometer values of a data stream, onto a target variable, which can be interpreted as the probability that the data stream contains a trip. More specifically, multiple data streams are collected and this data indicates elevator movement (or no movement). In examples, the amount of data is reduced by computing the mean of equidistant time intervals (e.g., 18 intervals) and this obtains the input feature vector x. The feature vector can then be normalized into an interval (e.g., the interval [−1, 1]). Once normalized, it can be determined if the data exceeds a threshold, which indicates movement.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method, the method comprising:
    storing a model in a memory, the model describing and predicting behavior of a new machine that is to be added to a group of currently operating machines;
    sensing first time series data at the new machine with a plurality of sensors;
    determining an activity value for the first time series data and discarding the first time series data when the activity value does not reach an activity threshold;
    when the activity value reaches the activity threshold, determining a type of the new machine based at least in part upon a comparison of the model with the first time series data;
    mapping the determined type to one or more sensors from the plurality of sensors, only the one or more sensors from the plurality of sensors sensing second time series data from the new machine;
    determining one or more of an event, a state, or an event duration at the new machine based upon an analysis of the second time series data; and
    responsively determining an action that improves performance of the new machine based upon an evaluation of one or more of the determined event, state, or event duration;
    wherein the electrical signal is transmitted to the new machine to control an aspect of the operation of the new machine, and the electrical control signal is applied to the new machine.

2. The method of claim 1, wherein the model is built previous to sensing the first time series data, the model being built based upon detected patterns in sensed third time series data.

3. The method of claim 1, wherein determining an event utilizes a sliding time window that is applied to the first time series data.

4. The method of claim 1, wherein the action is a maintenance action.

5. The method of claim 1, wherein the one or more sensors are configured to sense speed, electrical current, movement, pressure or temperature.

6. The method of claim 1, wherein a Hidden Markov Model (HMM) is used to filter the events based upon knowledge of a domain in which the new machine is operating.

7. A system, the system comprising:
    a network;
    a currently-operating machine that is coupled to the network;

a new machine that is to be added with the currently operating machine, the new machine having a plurality of sensors that sense first time series data at the new machine;

a control circuit including a memory that stores the model that describes and predicts behavior of the new machine, the control circuit being coupled to the network, the control circuit being configured to determine an activity value for the first time series data and discarding the first time series data when the activity value does not reach an activity threshold, the control circuit being configured to, when the activity value reaches the activity threshold, determine a type of the new machine based at least in part upon a comparison of the model with the first time series data, the control circuit further configured to map the determined type to one or more sensors from the plurality of sensors, only the one or more sensors from the plurality of sensors sensing second time series data from the new machine, the control circuit being further configured to determine one or more of an event, a state, or an event duration at the new machine based upon an analysis of the second time series data; and responsively determine an action that improves performance of the new machine based upon an evaluation of one or more of the determined event, state, or event duration;

wherein the electrical signal is transmitted to the new machine to control an aspect of the operation of the new machine, and the electrical control signal is applied to the new machine.

8. The system of claim 7, wherein the control circuit builds the model previous to sensing the first time series data, the model being built based upon detected patterns in sensed third time series data.

9. The system of claim 7, wherein the control circuit determines an event by utilizing a sliding time window that is applied to the first time series data.

10. The system of claim 7, wherein the action is a maintenance action.

11. The system of claim 7, wherein the one or more sensors are configured to sense speed, electrical current, movement, pressure or temperature.

12. The system of claim 7, wherein the control circuit utilizes a Hidden Markov Model (HMM) is used to filter the events based upon knowledge of a domain in which the new machine is operating.

* * * * *